United States Patent
Boutan (10) Patent No.: US 7,574,813 B1
(45) Date of Patent: Aug. 18, 2009

(54) PROTRACTOR FOR CALCULATING MITER AND BEVEL ANGLES FOR INSTALLING MOLDING

(76) Inventor: Christian R. Boutan, 12 B Morton Ave., Charleston, SC (US) 29407

(*) Notice: Subject to any disclaimer, the term of this patent is extended or adjusted under 35 U.S.C. 154(b) by 0 days.

(21) Appl. No.: 12/119,892

(22) Filed: May 13, 2008

(51) Int. Cl.
   *B43L 7/10* (2006.01)
   *G01B 3/56* (2006.01)
(52) U.S. Cl. .............................. 33/471; 33/495; 33/534
(58) Field of Classification Search ................... 33/1 R, 33/1 N, 1 PT, 415, 453, 456, 465, 471, 495–500, 33/503, 526, 527, 534–538, 558.01, 558.04, 33/558.4, 451; 52/287.1, 749.1, DIG. 1; 434/211, 215
See application file for complete search history.

(56) References Cited

U.S. PATENT DOCUMENTS

| | | | |
|---|---|---|---|
| 4,514,909 A | 5/1985 | Gilbert | |
| 5,040,298 A | 8/1991 | Weber | |
| 5,199,179 A * | 4/1993 | Baker | 33/415 |
| 5,533,270 A * | 7/1996 | van der Heiden | 33/403 |
| 5,611,147 A * | 3/1997 | Raab | 33/503 |
| 5,713,135 A * | 2/1998 | Acopulos | 33/451 |
| 6,334,257 B1 * | 1/2002 | Den Ouden | 33/1 N |
| 6,401,584 B1 * | 6/2002 | Rowe | 83/829 |
| 6,415,520 B1 * | 7/2002 | Locklear | 33/481 |
| 6,536,124 B1 * | 3/2003 | Eskew et al. | 33/471 |
| 6,796,046 B1 * | 9/2004 | May | 33/404 |
| 6,829,837 B2 | 12/2004 | Williams | |
| 7,143,520 B2 | 12/2006 | Engels | |
| 7,278,221 B1 * | 10/2007 | Shapiro | 33/471 |
| 7,451,576 B2 * | 11/2008 | Barone | 52/463 |
| 7,481,004 B2 * | 1/2009 | Krohmer et al. | 33/465 |
| 7,513,057 B2 * | 4/2009 | Robison et al. | 33/471 |
| 2005/0231712 A1 | 10/2005 | Engels | |
| 2006/0173801 A1 | 8/2006 | Music | |
| 2009/0038168 A1 * | 2/2009 | Wixey | 33/471 |

OTHER PUBLICATIONS

Bosch DWM40L Miterfinder Digital Protractor, CPO Tools, http://bosch.cpotools.com/other_tools_and_equipment/digital_protractos/dwm401.html.
Bosch Digital Protractor/Angle Finder DWM40L, Epinions.com, http://www.epinions.com/review/Bosch_Digital_Protractor_Angle_Finder_DWM40L/cont.

* cited by examiner

*Primary Examiner*—Amy Cohen Johnson
(74) *Attorney, Agent, or Firm*—Jim Passé; Passé Intellectual Property, LLC (57) ABSTRACT

Taught herein is a protractor capable of measuring angles within a room and angles related to the intended orientation of molding with respect to the room. Using these angles, the present invention will calculate and display the appropriate angles at which a miter saw must be set to produce mitered joints for the installation of trim and crown molding.

4 Claims, 9 Drawing Sheets

PROTRACTOR FOR CALCULATING MITER AND BEVEL ANGLES FOR INSTALLING MOLDING

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention is directed to an instrument capable of measuring angles between walls, floors, and ceilings within a room and measuring the spring angle and calculating and displaying the appropriate angles for cutting miter joints for the installation of trim and crown molding.

2. Description of Related Art

Throughout the history of architecture, molding has been used as a decorative embellishment and a means to cover imperfections in construction. In the present day, it is used in some form in most buildings ranging from massive edifices to modest homesteads. Typically, modern molding consist of strips of rigid or semi-rigid material including wood, plastic, rubber and the like, often having a decorative feature, and is used to cover intersections between building elements such as walls, floors, and ceilings as well as around doors and windows.

Where a turn is required, molding can be installed with joints where one piece simply abuts the adjacent piece, i.e. butt joints. However, when the molding has a decorative pattern, frequently employed are mitered joints where each of the adjacent pieces of each joint is cut on an angle. Generally, a mitered joint is considered to have a more finished and pleasing appearance than a simple butt joint but it requires greater precision. Usually, the miter angle is half of the angle of the required turn. For example, if molding must make a right angle, i.e., 90°, turn, each of the adjacent pieces is cut to a 45° angle where they are to be joined.

Making the appropriate cuts is a relatively straightforward operation if the piece to be cut is cut at the same angular orientation at which it is intended to be installed. The major problem with cutting trim arises from the fact that trim is usually cut lying flat on its back rather than at the installation orientation where it meets the wall, floor or ceiling. This change in orientation means that a 45° cut can no longer be achieved by simply setting a miter saw for a 45° miter or 45° bevel angle. A complex, unintuitive combination of miter and bevel angles is needed to achieve what otherwise would be a simple task. This calculation is a challenge to even an experienced craftsman who will often resort to trial and error. Specialized protractors and related angle measuring and calculating devises to facilitate making miters joints have appeared in the art. For example, see U.S. Pat. Nos. 5,040,298 and 6,829,837 as well as digital protractor DWM40L marketed by Bosch which assumes particular crown angles without a way to calculate the actual crown angle at which the trim will be installed.

BRIEF SUMMARY OF THE INVENTION

The present invention addresses a need in the finishing carpentry art to measure angles between adjacent surfaces as discussed above, such as two walls or a wall and a ceiling, and to measure the spring angle and employs the measured angles to calculate the appropriate miter and bevel angles for cutting molding for use on those surfaces.

In particular, the present invention is a protractor for assistance in miter and bevel angle calculations for joining molding comprising:

two arms, each having a longitudinal axis, a proximal end, and a distal end, joined by a pivot mean at their proximal ends and each having a means of attaching a specimen of molding at their distal ends wherein the pivot means has a means of measuring the angle between the two arms, wherein each arm has a means of rotating about its longitudinal axis to change each arm's angular relation between its respective proximal and distal ends, wherein the means of rotating has a means of measuring the angular relation, wherein the means of measuring the angle between the two arms and the means of measuring the angular relation are in communication, and wherein the logic unit is in communication with a display means that communicates the protractor's measurements and miter and bevel angle calculations to a user of the protractor.

The protractor taught herein is particularly useful for the installation of crown molding and similar trim molding not residing in the same plane as the surface, or surfaces, to which it is attached when the molding or trim is to be cut laying flat on the bed of a miter saw or the like. For example, when fitted to an upper corner of a room, where two adjacent walls and the ceiling converge, the present protractor provides a digital readout of the proper bevel and miter angle settings for a miter saw so that the crown molding may be cut while laying flat on the table of the miter saw.

DETAILED DESCRIPTION OF THE INVENTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "and an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Figure 1:
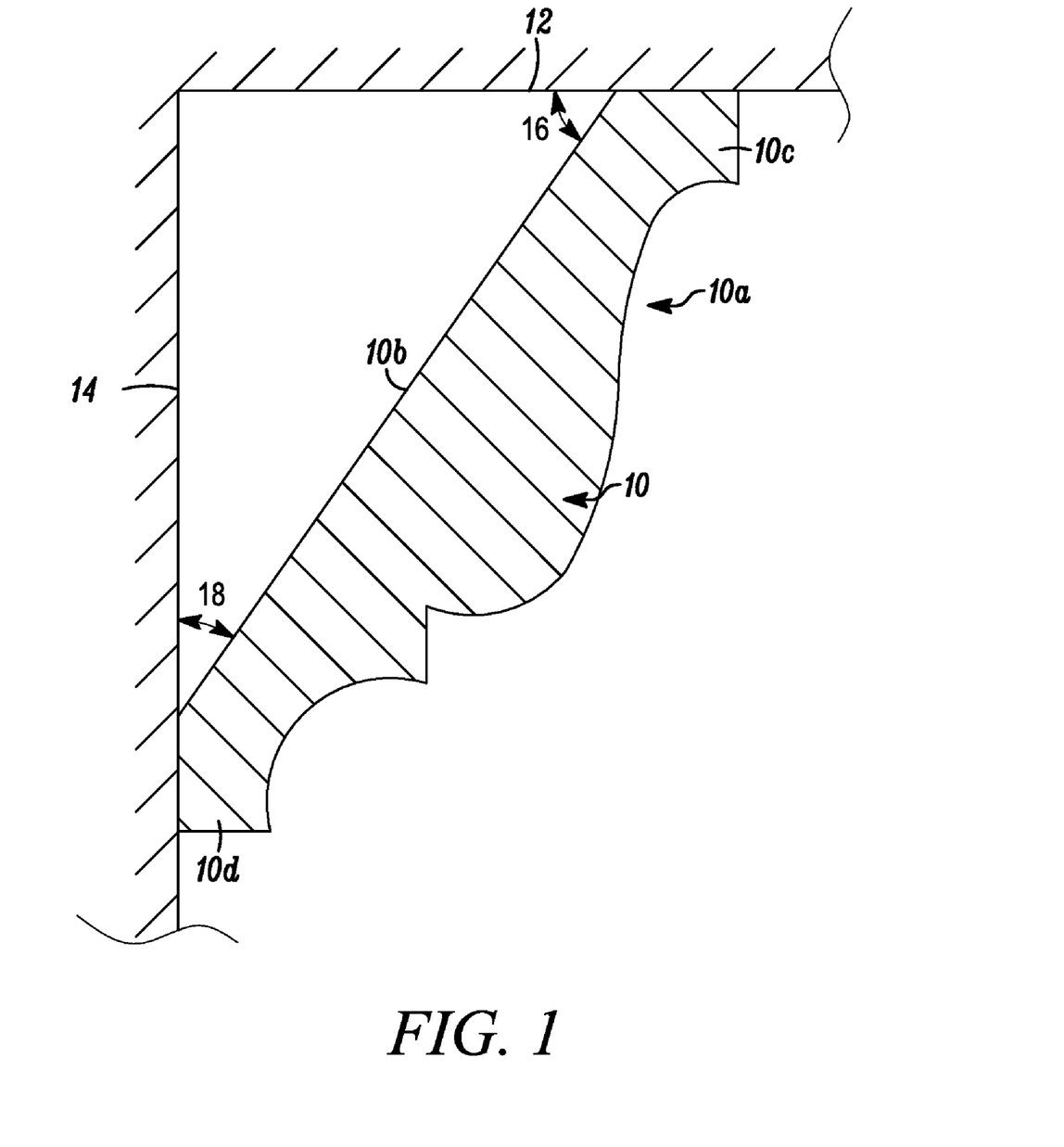
FIG. 1 is a cross-sectional view of crown molding as installed at the intersection of a wall and a ceiling.

FIG. 1 is a cross-sectional view of a unit of crown molding 10 installed at the intersection of a room's ceiling 12 and a wall 14. Crown molding 10 typically has a decorative pattern side, i.e., milled side, 10a that faces into the room and a substantially flat side 10b that faces the intersecting ceiling 12 and wall 14. Further, such crown molding 10 has a flat edge 10c that fits snugly against the ceiling 12 and a similar second edge 10d that fit snugly against the wall 14 so that the crown molding 10 sits at an angle 16 with respect to the ceiling 12 and a second angle 18 with respect to the wall 14.

In the art of finish carpentry, angle 18 is often referred to as the "crown angle" also called spring angle and is typically a parameter in crown molding 10 specifications, so, herein, "crown angle 18" is synonymous with "angle 18." For example, a unit of crown molding 10 of a particular pattern might be specified by its length, its width (usually at its widest point), and its crown angle 18. Typically, crown molding 10 purchased at a building supply store has a crown angle 18 of 45° or 38°, but that found in older buildings and custom made molding stock may have different crown angles. It follows from the principles of trigonometry that if the angle formed by the ceiling 12 and the wall 14 is a right angle, and if crown angle 18 is 45°, then angle 16 will also be 45°. Likewise, if the crown angle 18 is 38°, angle 16 will be 52°. It should be noted that just because a piece of molding has a particular crown angle associated with the molding that does not mean that the molding will be installed at that angle. There are certainly cases where it is desirable to install molding intended for one crown angle at a different crown angle. Obviously if this is not taken into consideration as can be done with the present invention the molding will not be properly cut or installed. In addition, the actual crown angle of a piece of molding is often different than the angle at which it was supposed to be milled. For example a molding sold with a 38° crown angle may be cut at 37° or the like. Accordingly being able to precisely measure the crown angle that the molding will be installed at is a huge advancement over the current state of the art.

Figure 2A:
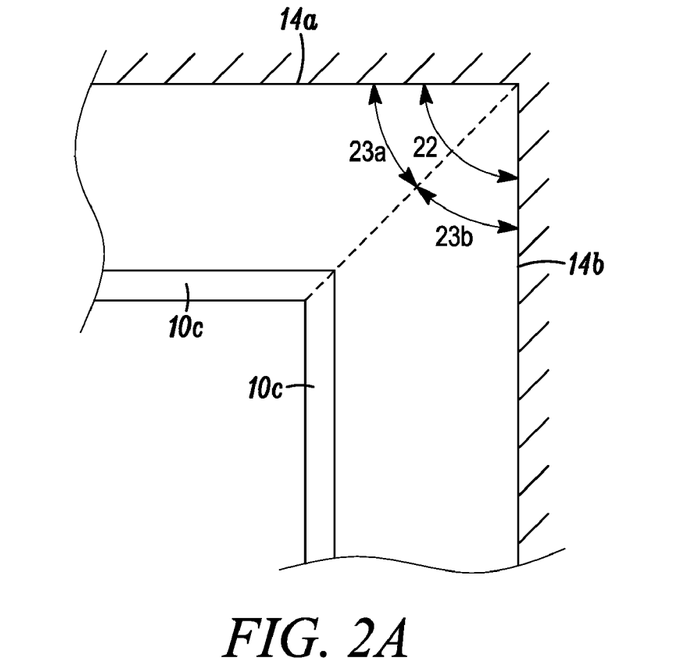
FIGS. 2a-d illustrate types of corners encountered when installing crown molding.

FIGS. 2a-2d illustrate common types of crown molding 10 mitered joints as viewed looking down from the plane of the ceiling 12. FIG. 2a illustrates an inside right angle corner and associated crown molding 10 joint wherein the angle between adjacent walls, i.e. wall angle 22 is a right, that is, a 90°, angle. The miter angle 23a and miter angle 23b of the adjoining units of molding are equal and are half of the wall angle 22. Thus, in this case, the wall angle is 90°; therefore miter angles 23a and 23b are both 45°. The inside right angle corner is perhaps the most common situation requiring a mitered joint considering that an ideal rectangular shaped room has four such corners.

Figure 2B:
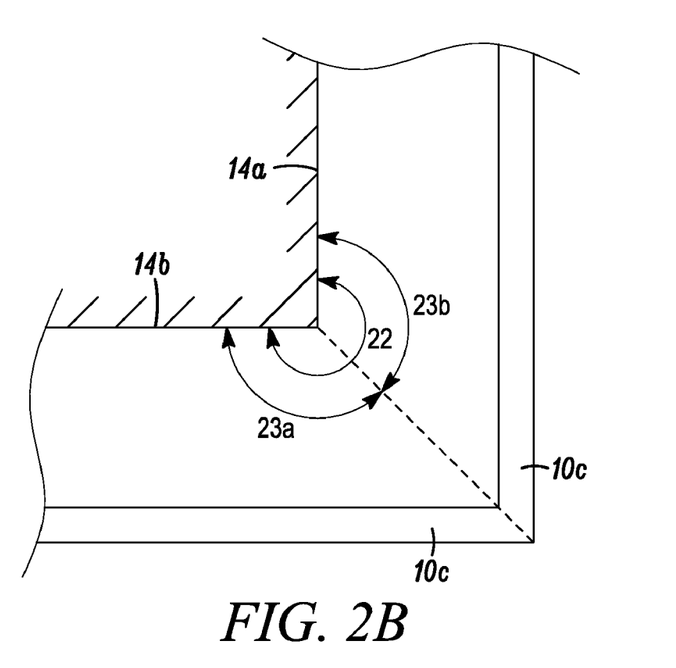

FIG. 2b depicts another frequently encountered situation, an outside corner, wherein the wall angle 22, as measured from the outer surfaces of the adjacent walls, is 270° (360°−90°). The miter angles 23a and 23b are nominally 135° ("neo-angle"), but the artisan appreciates the trigonometric relationship between 135° and 45° when setting up a miter saw.

Figure 2C:
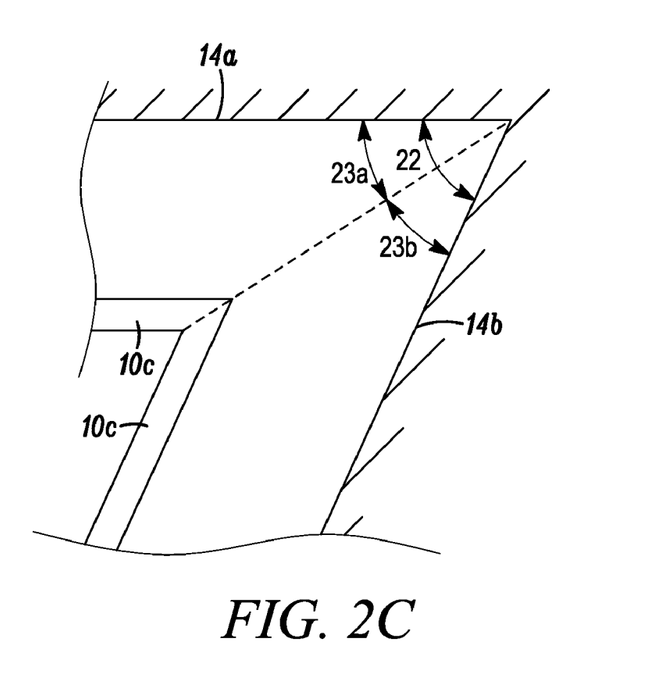
Figure 2D:
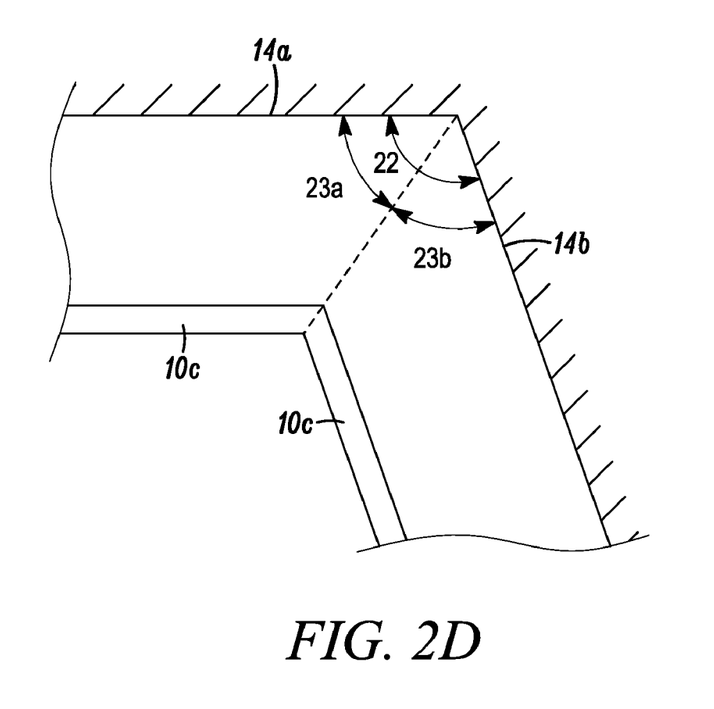

FIG. 2c depicts an inside, acute angle corner. While this class of corner occasionally arises from a deliberate architectural design, it far more often arises when the walls of a room are "out of square" because of shifting of the walls over time or inaccurate workmanship. Likewise, an inside, obtuse angle corner (for example, in an octagonal room), as illustrated in FIG. 2d, occurs for the same reasons and with the same frequency. Although not illustrated in FIGS. 2a-d, as the artisan will recognize, outside acute angle and outside obtuse angle corners may also be encountered. However, both of these types of corners are analogous to those discussed above wherein the miter angles are half of the wall angles.

Because crown molding is installed in a plane that is not within, or parallel to, the planes of the walls, floors, ceiling, i.e. it is installed in three dimensions, it is difficult to measure and cut the accurate miter joints. By comparison, a finishing carpenter with a miter saw can quickly and accurately fit flat molding, i.e., molding installed in one plane, such as the molding around doors and windows. Ideally, crown molding is oriented in the miter saw the same way it will be fitted to the wall and ceiling. However, it is far from intuitive, and even the skilled carpenter often results to "trial and error" to get well fitting crown molding mitered joints if the crown molding is oriented differently in the miter saw.

If a piece of molding could be oriented in a miter saw the same way that it is to be installed, then cutting the molding would be made much easier. However, miter saws are designed to cut molding in a flat position since it is easier to cut the molding laying flat cross the table of the miter saw, i.e. a flat cut, than cutting it in the same orientation as it will be when installed. The ease in cutting the molding is then replaced with a complex combination of both miter and bevel angles. For example, if molding is to be installed in a 90° corner, the miter angle would be 45° with respect to molding in its proper orientation. However, if one is cutting the molding lying flat, the miter cut can no longer be accomplished by simply setting the miter angle on the miter say to 45°. Now the crown molding is rotated by the crown angle necessitating a non-linear calculation to obtain the proper miter and bevel angle. If the crown angle is 38°, a bevel angle of 33.9° and a miter angle of 31.6° is required.

Tables providing corrections for flat cutting crown molding are available on the Internet and in some finish carpentry books. Alternatively, the bevel and miter angles can be calculated using the following algorithms:

Bevel Angle=arcsin [ cos(wall angle/2)cos(crown angle)]

Miter Angle=arctan [ cot(wall angle/2)sin(crown angle)]

However, consulting tables or doing complex trigonometric calculation is impractical and time consuming on a construction job site.

A carpenter will often take two pre-cut pieces of crown molding (often copied from pieces known to have the correct bevel and miter for a given wall angle, e.g. 90°) and fit them to the corner as a gauge to see what if any adjustment need to be made. The protractor taught herein employs this already familiar action of gauging with actual samples of crown molding stock. It quickly, accurately, and efficiently measures the wall angle using actual samples of the crown molding to be installed and provides readouts of the bevel and miter angles to be set on the miter saw.

Figure 3A:
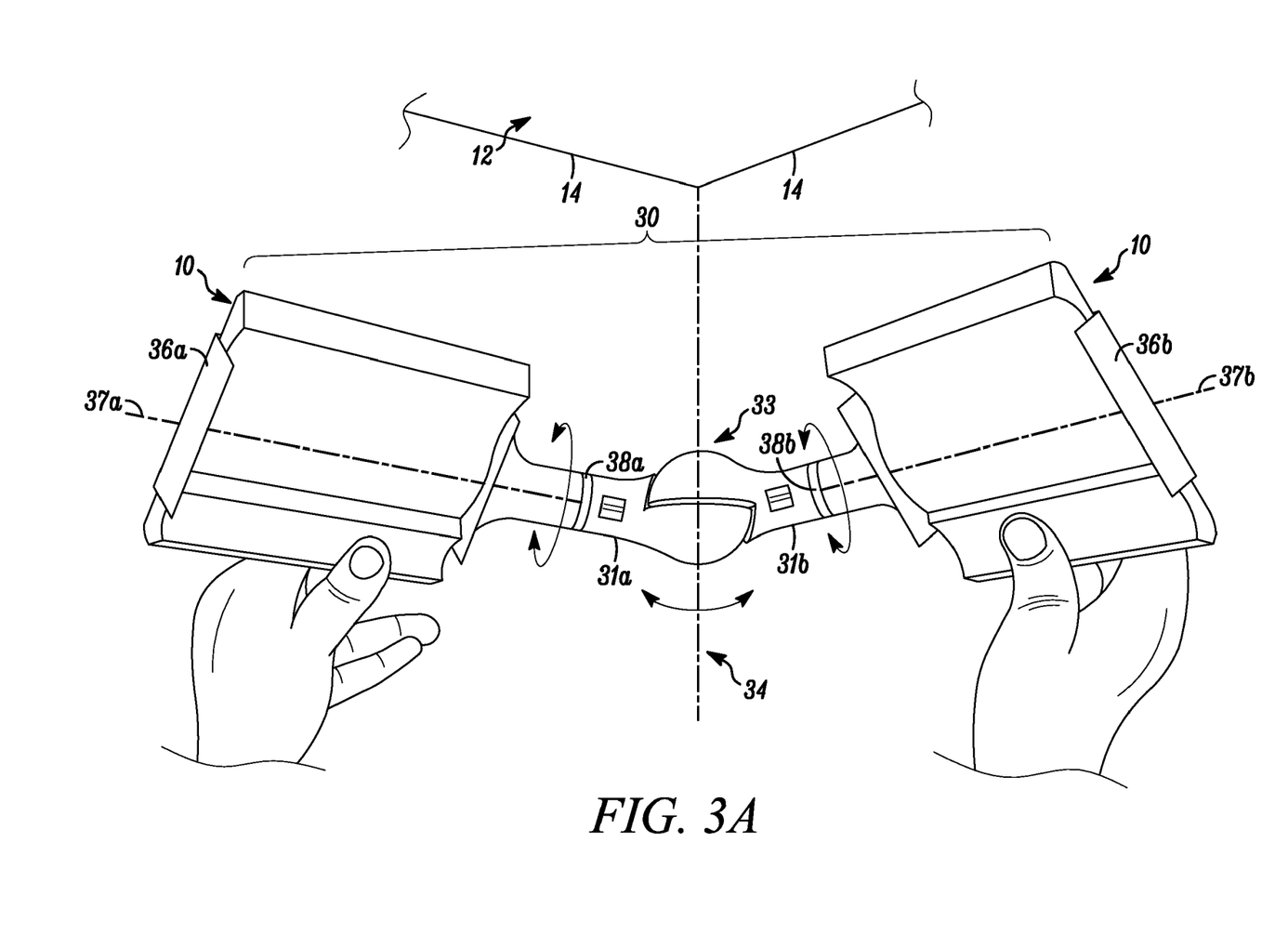
FIG. 3a is an overview of the present protractor.
Figure 3B:
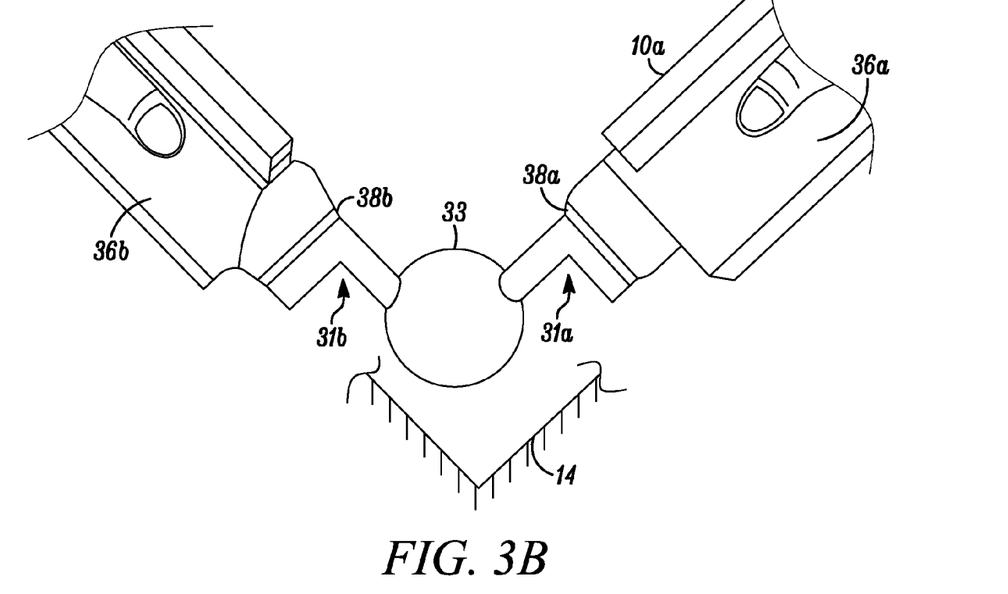
FIG. 3b illustrates the present protractor as it would appear when viewed from a ceiling looking straight down.

FIG. 3a depicts an overview of the basic embodiment of the protractor 30 of the present invention. Arms 31a and 31b have their proximal ends attached at central pivoting unit 33 that is fitted with a means of sensing the angle between arms 31a and 31b as they pivot around central axis 34. At the distal end of each of arm 31a and 31b is a means of attachment 36a and 36b respectively of a specimen of crown molding 10 specified for the particular installation. Each arm 31a and 31b may fully rotate around its longitudinal axis, 37a and 37b through collar 38a and 38b respectively. FIG. 3b is a view of protractor 30 positioned as in FIG. 3a but viewed from the ceiling.

Figure 3C:
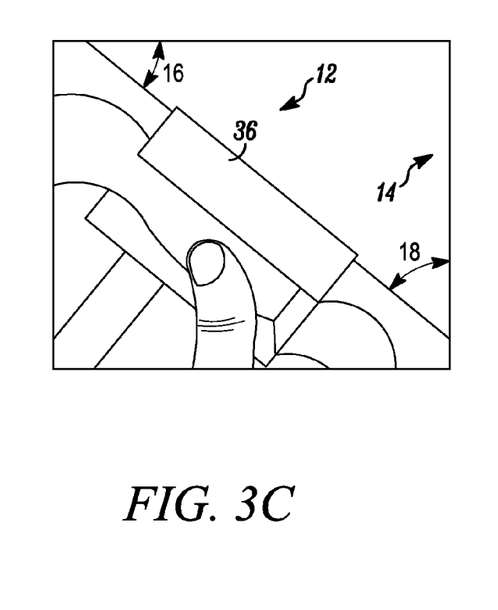
FIG. 3c is a detailed view of a specimen of crown molding attached to an arm of the present protractor and fitted snuggly against a ceiling and adjacent wall.

The protractor 30 is positioned in a corner so that each of the specimens of crown molding 10a and 10b are properly oriented to snugly bridge the intersection of the walls and ceiling as illustrated in FIG. 3c (also see FIG. 1 and its teachings above). When this operation has been completed, the actual wall angle (22 in FIGS. 2a-2d) and crown angle (18 in FIG. 1 and FIG. 3c) are directly measured and the bevel and miter angles needed for cutting the crown molding lying flat on the table of a miter saw are calculated by one or more internal logic circuits within protractor 30 and displayed on the exterior of the protractor in addition to the wall and crown angles. These four angles may be read on one or more LEC, LED, or comparable display units known in the art. FIG. 3 illustrates the display units on each of the arms 31a and 31b near central pivot unit 33. Feature, components, and operation of protractor 30 are taught and illustrated in detail below.

The central pivot unit 33 may be constructed in any suitable manner consistent with its function. However, it is conveniently constructed as a hemisphere to which one arm, 31a or 31b, is attached and a second hemisphere to which the other arm is attached, and the two hemispheres are joined through a common axle to form a sphere. Thus, the two arms 31a or 31b may be rotated with respect to each other. As shown in FIG. 3a, the proximal ends of arms 31a or 31b form the two hemispheres.

Conveniently, housed within the central pivot unit 33 is a means of sensing the angular relationship of arms 31a or 31b, i.e., an angle sensor. Also, conveniently housed within the central pivot unit 33 are one or more electronic logic circuits, collectively referred to as a logic unit, such as a micro computer module, that receives input from the angle sensor in the central pivot unit and the angle sensors in each of the rotating arms 31a and 31b.

Figure 4A:
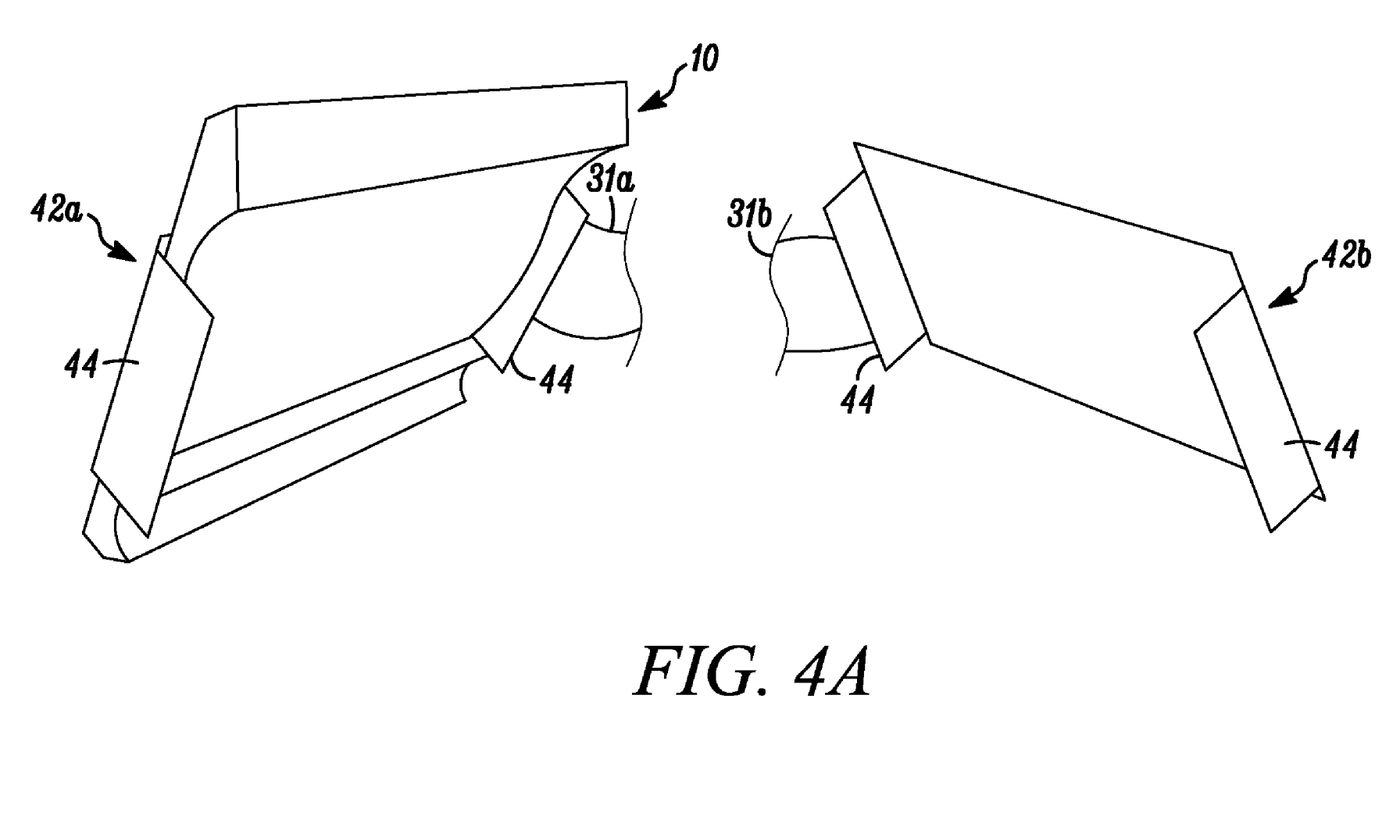
FIGS. 4a-d illustrate means of attaching specimens of crown molding to the present protractor.
Figure 4B:
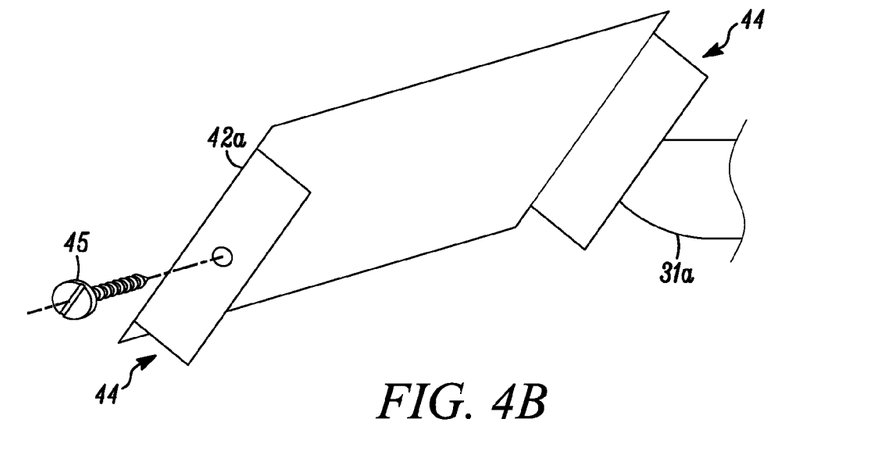
Figure 4C:
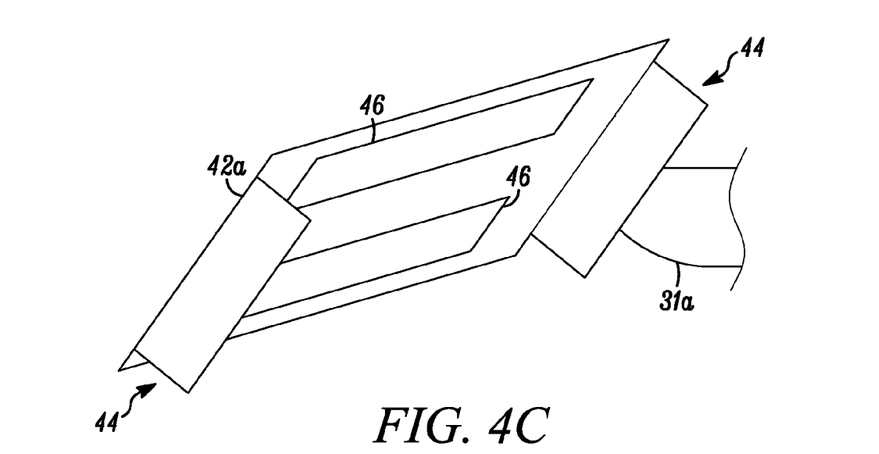

The means of attachment 36a and 36b at the distal end of arms 31a and 31b respectively for a specimen of molding, e.g. crown molding 10 (see FIGS. 3a-3b), may be any suitable means known in the art for affixing specimens of molding to the ends of arms 31a and 31b. A convenient means of attachment 36a and 36b is depicted in FIGS. 4a-c wherein specimens of crown molding 10 are affixed to each of pads 42a and 42b that form the distal ends of arms 31a and 31b respectively. For illustration purposes, a specimen of crown molding 10 is shown affixed to pad 42a while a specimen has not yet been affixed to pad 42b so that the features of pad 42b are visible. The sides of pads 42a and 42b, collectively 44 in FIGS. 4a-d, serve to properly align the specimens of crown molding 10 with respect to 42a and 42b. Improper alignment might result in an inaccurate measurement by protractor 30. Note that pads 42a and 42b are substantially the same although with regard to some features, they may be the mirror images of each other, so that a description of either 42a or 42b is understood to also apply to the other.

One embodiment of the means of affixing a specimen of crown molding 10 to pad 42a (and, of course, 42b as well) is shown FIG. 4b. Here the specimen of crown molding 10 is affixed to its corresponding pad, i.e. pad 42a, by one or more thumb screws 45, or functionally equivalent devices, wherein the shank of the screw passes through a threaded section of one or more sides 44 of pad 42a. As the screw 45 is tightened, it applies pressure to the specimen of crown molding 10 forcing it against the opposite side 44 of pad 42a. Therefore, the specimen is both affixed to, and aligned with, the protractor 30. One example of a functionally equivalent device of this embodiment is a spring-loaded pressure plates system attached to one or both sides 44 of pad 42a. Thus, the pressure plate system squeezes the specimen tightly against the sides 44 thereby affixing and aligning the specimen to pad 42a. Note also that a screw clamping means, not shown, could be used as well.

Figure 4D:
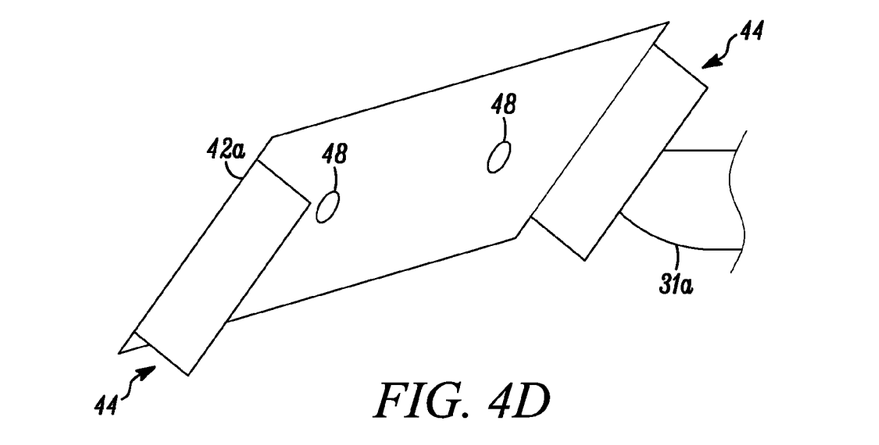

Alternative embodiments of the means of affixing a specimen of crown molding 10, as illustrated in FIG. 4c, include adhesive stripes 46 on the surface of pad 42a (42b) or, as shown in FIG. 4d, one or more holes 48 to allow the passage of screws through pad 42a (42b) and into the specimen of molding 10. Conveniently and simply, adhesive stripes 46 may be widely available double-sided tape. Further, functionally equivalents to adhesive stripes 46 such as hook and fabric fasteners (such as the fastener sold under the trademark, Velcro) may be used in lieu of adhesive strips 46. The various alternative affixing means taught herein are not mutually exclusive and may be used in combination.

Figure 5A:
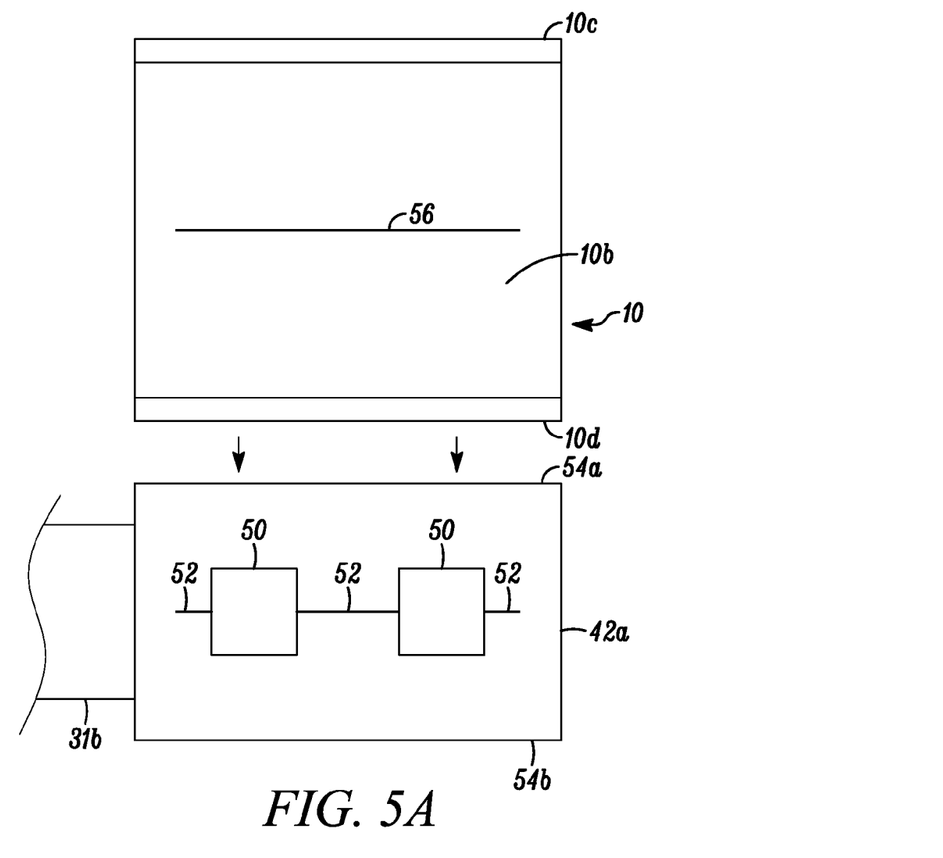
FIGS. 5a and b illustrate a means of aligning the specimens of crown molding with the present protractor.
Figure 5B:
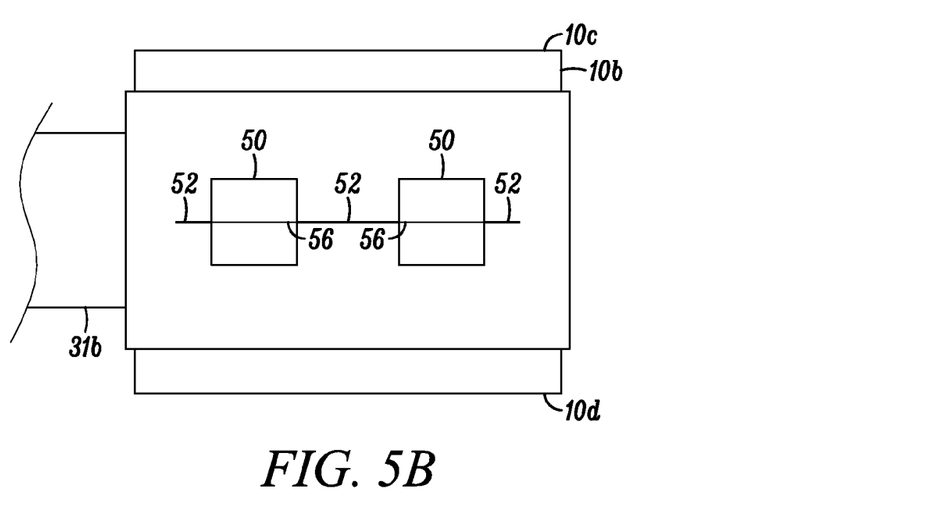

Regardless of which means of affixing a specimen of crown molding 10 taught above is employed, each of the two specimens should be properly aligned and securely fastened to permit accurate measurement and miter/bevel calculations by protractor 30. One means of accomplishing such proper alignment is illustrated in FIGS. 5a and 5b. FIGS. 5a and 5b shows windows 50 in pad 42a as viewed from the back of 42a. As noted above, what is taught for 42a equally applies to 42b. For the purpose of illustration, FIGS. 5a and 5b show two windows 50, but one or more are within the scope of invention. At the sides of each of windows 50 are index lines 52 which are centered between, and parallel to, the top 54a and the bottom 54b of pad 42a. A line 56 is inscribed across the back 10b of specimen of crown molding 10, centered between, and parallel to, the top 10c and bottom 10d of the specimen of crown molding 10. The specimen of crown molding 10 is affixed to pad 42a (using for example, one of the means of affixing taught above) so that the inscribed line 56 on the back 10b of the specimen is aligned with the index lines 52 as shown in FIG. 5b.

As the distal ends of the arms 31a and 31b are rotated to align the specimens of crown molding 10 with the ceiling and walls (see FIGS. 3a-c), angle sensors in arms 31a and 31b interpret rotation through collars 38a and 38b as a change of angle of each specimen of crown molding 10 with respect to the central pivot unit 33. For example, if the crown angle 18 is 38°, when the specimens at the distal ends of the arms 31a and 31b are positioned snugly against the ceiling and a wall as shown in FIG. 3a, the crown angle sensors will interpret that the specimen of crown molding 10 has a crown angle of 38°. Likewise, as protractor 30 is placed in a corner (see FIG. 3a) and the two specimen at the ends of the arms 31a and 31b are positioned snugly against the ceiling and walls, a wall angle sensor in the central pivot unit 33 senses the wall angle 22 (see FIGS. 2a-2d).

While the crown angle and wall angle sensors may be mechanical and the interpretation of the angles displayed by an analog means, preferably, these sensors are electronic as are the associated means of interpretation and display. Conveniently, the crown angle sensor are located within the central pivot unit 33 or in the arms themselves (31a and 31b) and sense the rotation of the distal ends of arms 31a and 31b with respect to the central pivot unit 33. Information from each of the crown angle sensors are communicated to an electronic logic unit conveniently located within the central pivot unit 33 for interpretation. For example, when the plane of pads 42a and 42b are orthogonal to the plane of rotation of the central pivot unit 33, the logic unit interprets the crown angle 18 as zero, whereas when the planes are congruent with, or parallel to, the interpretation is 90°. In a similar manner, the rotation sensor in the central pivot unit 33 is also in communication with the logic unit. When both arms 31a point along a single axis, the wall angle 18 is interpreted as 180° (that is, a straight wall), and when the planes of the two arms are perpendicular, the wall angle is interpreted as 90° (an inside corner) or 270° (an outside corner).

Figure 6A:
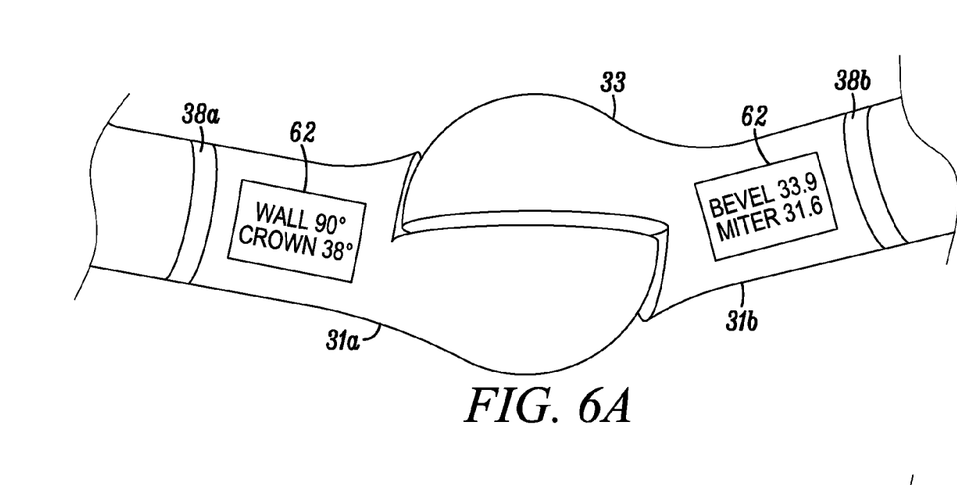
FIGS. 6a and b illustrate examples of typical displays on the present protractor.
Figure 6B:
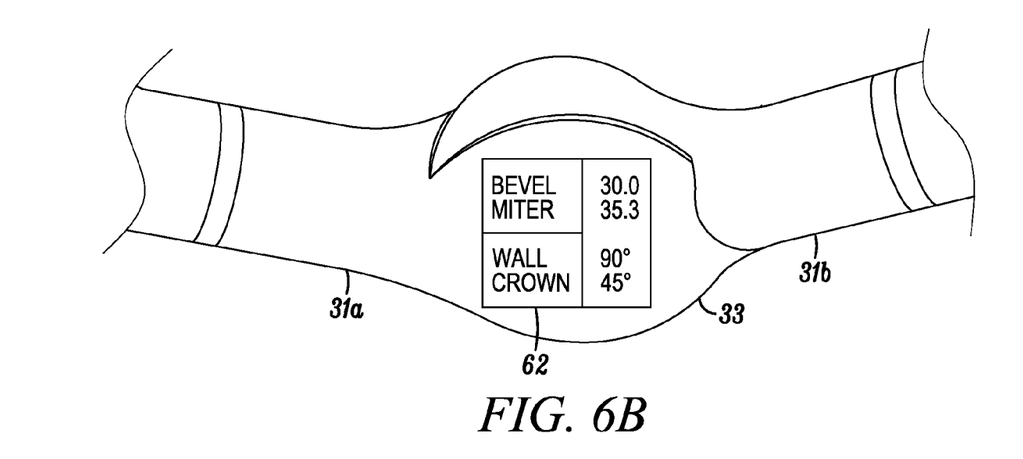

The logic unit is programmed to calculate the proper bevel and miter settings for flat cutting crown molding from the input of the crown angle 18 and the wall angle 22 and displays the crown angle 18, wall angle 22, and bevel/miter angles on the exterior of protractor 30 for viewing by the user. Conveniently, the display(s) 62 are located as shown in FIG. 6a or, alternatively, as shown FIG. 6b.

Protractor 30 may be constructed in a manner similar to, and of the materials similar to, other mechanical and electro-mechanical measuring instruments known in the art. For example, the body may be constructed of metal, polymeric materials, wood, or a combination thereof. Likewise, the electronic components, such as the angle sensing elements and the displays, may be assembled by means, and of materials, well known in the art of electronic instrument. Preferably, protractor 30 is fabricated from such materials that make it light weight yet sturdy enough to withstand a typical construction site environment. The logic unit of protractor 30 may have one or more output ports so that information generated may be communicated to a computer, e.g., a computer that directs a cutting means such as a saw.

Other options for the present invention would be an on/off function button and a means for freezing or capturing the miter calculations so that if the arms are moved, the user will not lose the calculated angles.

In another embodiment there is further disclosed a means for pivoting the arms holding the molding specimens. The arms could rotate in a manner that they do not leave the plane they are in. This would be useful in the case where the arms had become misaligned for one reason or another. The arms could further be spring loaded to return to the non-rotated position.

The present invention is useful in many embodiments. One skilled in the art will be able to pick useful items such as buttons, digital displays, materials and the like within the scope of the present disclosure the examples are just that and not intended to be limiting of the claims which follow.

What is claimed is:

1. A protractor for assistance in miter and bevel angle calculations for joining molding comprising:
   two arms, each having a longitudinal axis, a proximal end, and a distal end, joined by a pivot means at their proximal ends and each having a means of attaching a specimen of molding at their distal ends;
      wherein the pivot means has a means of measuring the angle between the two arms;
      wherein each arm has a means of rotating about its longitudinal axis to change each arm's angular relation between its respective proximal and distal ends;
      wherein the means of rotating has a means of measuring the angular relation;
      wherein the means of measuring the angle between the two arms and the means of measuring the angular relation are in communication with a logic unit; and
      wherein the logic unit is in communication with a display means that communicates the protractor's measurements and miter and bevel angle calculations to a user of the protractor.

2. The protractor of claim 1 wherein the pivot means is an axle and the protractor has a means of sensing the relative positions of the two arms with respect to the axle.

3. The protractor of claim 1 wherein the means of measuring the angle between the two arms, the means of measuring the angular relation, the logic unit and the display are electronic.

4. The protractor of claim 1 which further comprises a means for capturing the miter calculations.

\* \* \* \* \*